US 8,406,421 B2

(12) United States Patent
Kamen et al.

(10) Patent No.: US 8,406,421 B2
(45) Date of Patent: Mar. 26, 2013

(54) METHOD AND SYSTEM FOR MULTI-LEVEL SECURE PERSONAL PROFILE MANAGEMENT AND ACCESS CONTROL TO THE ENTERPRISE MULTI-MODAL COMMUNICATION ENVIRONMENT IN HETEROGENEOUS CONVERGENT COMMUNICATION NETWORKS

(75) Inventors: Vladimir Kamen, San Francisco, CA (US); Farzad Naimi, Atherton, CA (US); Kayvan Alikhani, Oakland, CA (US)

(73) Assignee: Passban, Inc., San Francisco, CA (US)

( * ) Notice: Subject to any disclaimer, the term of this patent is extended or adjusted under 35 U.S.C. 154(b) by 1698 days.

(21) Appl. No.: 11/444,566

(22) Filed: May 31, 2006

(65) Prior Publication Data

US 2007/0115940 A1    May 24, 2007

Related U.S. Application Data

(60) Provisional application No. 60/727,089, filed on Oct. 13, 2005, provisional application No. 60/755,734, filed on Dec. 29, 2005, provisional application No. 60/755,472, filed on Dec. 29, 2005.

(51) Int. Cl.
*H04L 9/28* (2006.01)
(52) U.S. Cl. .................... 380/28; 370/328; 370/407
(58) Field of Classification Search .................... 370/352
See application file for complete search history.

(56) References Cited

U.S. PATENT DOCUMENTS

| | | | | |
|---|---|---|---|---|
| 6,731,625 | B1 * | 5/2004 | Eastep et al. | 370/352 |
| 7,110,522 | B1 * | 9/2006 | Cesario, Jr. | 379/265.01 |
| 2004/0059921 | A1 * | 3/2004 | Bianchi | 713/185 |
| 2004/0158492 | A1 * | 8/2004 | Lopez et al. | 705/14 |
| 2005/0141447 | A1 * | 6/2005 | Carlton et al. | 370/328 |
| 2006/0133604 | A1 * | 6/2006 | Buer et al. | 380/28 |

FOREIGN PATENT DOCUMENTS

| | | |
|---|---|---|
| EP | 1 263 164 A1 | 4/2002 |
| WO | 02/37794 A1 | 5/2002 |

OTHER PUBLICATIONS

M I Wardlaw, Intelligence and mobility for BT's next generation networks, BT Technology Journal, Jan. 2005, pp. 28-47, vol. 23 No. 1, Kluwer Academic Publishers.

* cited by examiner

*Primary Examiner* — Asad M Nawaz
*Assistant Examiner* — Jason Harley
(74) *Attorney, Agent, or Firm* — Maryam Imam; IPxLaw Group LLP

(57) ABSTRACT

A method and apparatus, in accordance with an embodiment of the present invention, is presented for securely accessing a voice-enabled communication terminal using Internet Protocol by performing physical authentication, performing biometric authentication, performing logical authentication, performing confirmation of a user and upon successful confirmation of the user, allowing access to the communication terminal.

16 Claims, 7 Drawing Sheets

METHOD AND SYSTEM FOR MULTI-LEVEL SECURE PERSONAL PROFILE MANAGEMENT AND ACCESS CONTROL TO THE ENTERPRISE MULTI-MODAL COMMUNICATION ENVIRONMENT IN HETEROGENEOUS CONVERGENT COMMUNICATION NETWORKS

REFERENCE TO PRIOR APPLICATIONS

This application claims the benefit of a previously filed U.S. Provisional Patent Application No. 60/727,089 filed on Oct. 13, 2005, and entitled "Method and System for Multi-Level Secure Personal Profile Management and Access Control to the Enterprise Multi-Modal Communication Environment in Heterogeneous" and further claims the benefit of a previously filed U.S. Provisional Patent Application No. 60/755,734 filed on Dec. 29, 2005, and entitled "Method and Apparatus for Adaptive Management of Multi-Modal Secure Service Point in Heterogeneous Converged Communication Networks" and further claims the benefit of a previously filed U.S. Provisional Patent Application No. 60/755,472 filed on Dec. 29, 2005, and entitled "Method and System for Secure Centralized Multi-Modal User Authentication Over Heterogeneous Convergent Communication Networks".

BACKGROUND OF THE INVENTION

1. Field of the Invention

The present invention relates generally to the field of voice-over-Internet-Protocol (VoIP) and particularly to IP telephones, capably processing, receiving and transferring voice, data and/or video streams, and being secure and controlled for secure profile management and convergent communications.

2. Description of the Prior Art

With the advent of the Internet and particularly its popularity within the recent decade, information, in its multitude of forms, is commonly transferred in various forms using the Internet. This method of communication offers users a cost-effective, flexible and oftentimes convenient approach to information transfer. What is of particular interest is the use of telephones or voice-enabled communication terminals throughout the Internet for transfer of voice, data and/or video streams. In fact, many communication terminals may be placed at various remote locations relative to each other throughout the Internet cloud thereby allowing users to communicate to one another through the Internet.

The use of IP telephones—telephones using Internet Protocol (IP) to communicate over the Internet, any local area network or any other IP network—currently offers less security than that of conventional telephones in the Public Switching Telephone Network. Security, remote access and controllability of communications terminals within the Internet are therefore highly desirable.

The need therefore arises for secure access and optionally remote control to voice-enabled communications terminals, such as IP phones, which are remotely located to one another allowing multiple users to communicate using VoIP using multi-level security to avoid unauthorized access to the functions of the communications terminal.

SUMMARY OF THE INVENTION

Briefly, an embodiment and method of the present invention includes securely accessing a voice-enabled communication terminal using Internet Protocol by performing physical authentication, performing logical authentication, performing biometric authentication and performing authentication of a user and upon successful confirmation of the user, allowing access to the communication terminal.

The foregoing and other objects, features and advantages of the present invention will be apparent from the following detailed description of the preferred embodiments which make reference to several figures of the drawing.

IN THE DRAWINGS

FIGS. 1(a)-(d) show different configurations of a secure service point (SSP) system 10 having multi-location enterprise heterogeneous convergent communication infrastructure enhanced with the hardware and software for secure personal profile management and access control to the enterprise communication and business services over convergent network according to the embodiment of the present invention.

DETAILED DESCRIPTION OF THE PREFERRED EMBODIMENTS

Figure 1A:
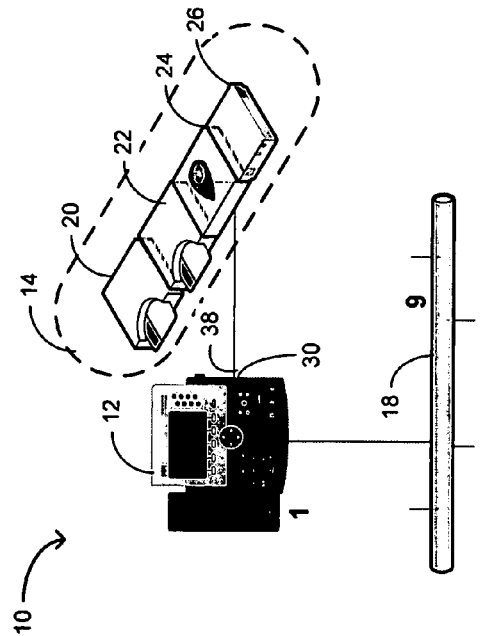
Figure 1B:
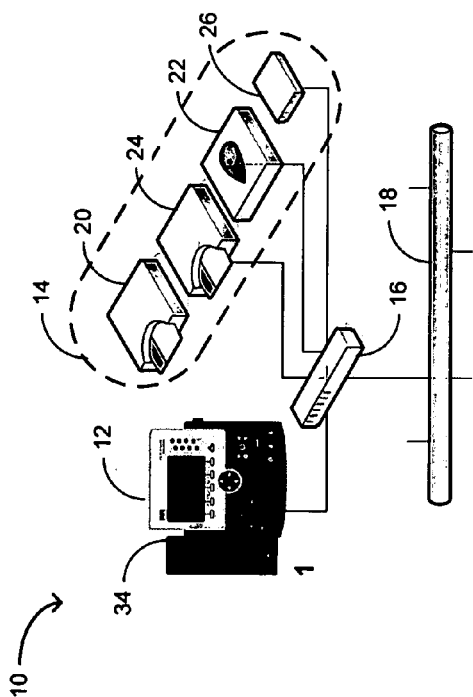
Figure 1C:
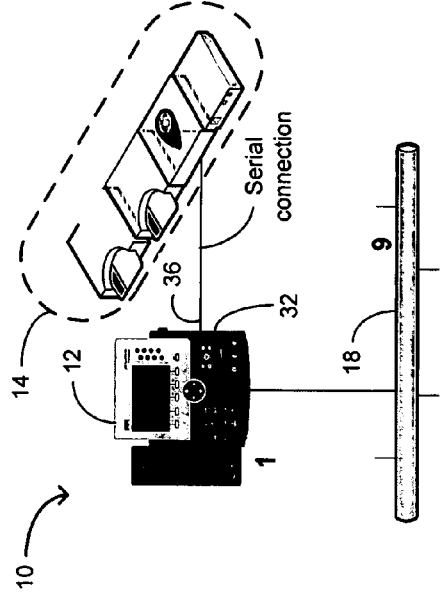
Figure 1D:
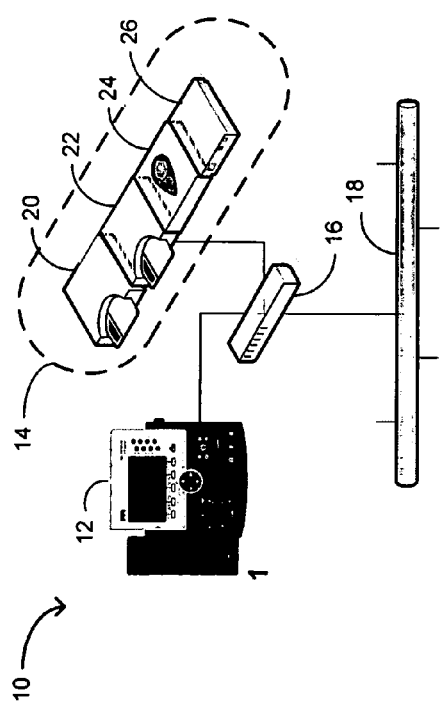

Referring now to FIGS. 1(a)-(d), a secure service point (SSP) system 10 is shown with different configurations represented in each of the foregoing figures, in accordance with various embodiments of the present invention. In FIG. 1(a), the SSP system 10 is shown to include an IP telephone 12, a secure personal authentication reader (SPAR) device 14, a network switch 16 and an IP network line 18, in accordance with an embodiment of the present invention. The IP telephone 12 is merely an example of a voice-enabled communication terminal; accordingly, any voice-enabled network device capable of being controlled remotely may be used in place thereof. The terms "IP telephone" and "VoIP telephone" are used interchangeably herein.

The SPAR device 14 in each of the FIGS. 1 (a)-(d) includes one or more readers with each reader generally being of a different type. In the figures, the SPAR device 14 is shown to include a number of readers, which are each readers 20-26. It should be noted that the SPAR device 14, while shown in the figures to include four readers, may include any number of readers. Furthermore, each of the readers 20-26 may be of a different type, such a smart card reader, a biometric reader, a magnetic card or RFID, or of similar type. Examples of a reader are card readers, smart card readers, biometric reader or Radio Frequency Identification (RFID). The choice of which combination of readers to use is one of design. Nonetheless, these readers are utilized for confirmation of the identity of a user in various ways, such as a fingerprint if the biometric reader is employed, which will be discussed further in relation to levels of security shortly.

Moreover the SPAR device 14 may include any combination of $3^{rd}$ party magnetic card reader, smart card reader, RFID reader, any type of biometric information reader (fingerprint, palm print, iris/retina reader) and any type of keyboard input device, and is capable of reading, capturing and securely transmitting the captured authentication information to an IP network using either wired or wireless connection, as will become further evident shortly.

The readers 20-26 can be coupled to the network line 18 individually and independently, directly or using the switch 16. Moreover, they can be combined into one enclosure and coupled directly to the network line 18, as shown in FIGS. 1(*a*) and 1(*c*) or coupled through a built-in Ethernet port 30 on the telephone 12, as shown in FIG. 1(*b*) or couple to a built-in RS-232 port 32 on the telephone 12, as shown in FIG. 1(*d*).

In FIG. 1(*a*), the telephone 12 and the SPAR device 14 are shown coupled to the switch 16, which is, in turn, shown coupled to the network line 18. The device 14 is generally affixed or in some manner connected to the telephone 12 at a location, for example, to the side or top or bottom of the telephone. An example location of the device 14 is at 34.

The SPAR device 14 can be associated with a wired or wireless IP telephone, such as the IP telephone 12, either by connection to the IP telephone through a dedicated RS-232 port on the phone, by connection to the IP network through a network switch on the IP phone, or by connection to the IP network through a physical connection separate from the IP telephone so that the user can use the keypad on the IP telephone as a keyboard input device and can use the IP telephone as a multi-modal communication device during an authentication procedure. The combination of the IP telephone and the SPAR device 14 is, at times, referred to as "Secure Service Access Point" (SSAP).

In the case where the readers of the device 14 are individually coupled through the switch 16, to the network line 18, such as shown in FIG. 1(*a*), different types of readers are clearly available for identification, whereas, in the case where one or fewer than the number of readers available are coupled through the switch 16 to the network line 18, clearly fewer readers are available for identifying a user. In FIG. 1(*d*), the connection of the device 14 to the network line 18 is through the telephone 12 and no switch is employed.

In FIG. 1(*d*), a connection 36 couples the device 14 to the telephone 12 and in one embodiment of the present invention, the connection 36 is a serial connection, such as RS-232. In FIG. 1(*b*), a connection 38 couples the device 14 to the telephone 12 and in one embodiment of the present invention, it is a IP or network connection.

Some of the capabilities and/or functions of the system 10, while not limited to the same, are enumerated as follows:

1. Ability to automatically discover and/or to remotely provision third-party SPAR devices including (but not limited to) various device configuration parameters, relevant physical and logical associations (for example, association with an IP Phone), supported industry-standard security and connectivity parameters, real-time device status, etc.
2. Ability to collect (by way of using various third party readers comprising the SPAR device 14) all or any combination of the following three pieces of authentication data: biometric authentication token (using fingerprint, palmprint or iris/retina reader), user-possessed physical token (using any third party smart cards, magnetic cards or RFID token and the corresponding reader), and logical authentication token (using any third party keyboard input device including but not limited to dial pad of the associated IP Phone)
3. Ability (by use of the aforementioned SPAR device embedded firmware) to encrypt all or any portion of the captured authentication data using industry-standard encryption mechanisms, technologies and schemas, and to pass the captured and encrypted authentication data over a secure convergent network using any of industry-standard secure and reliable network protocols (e.g., HTTPS, SSL, etc.) to a centralized software component that would decrypt the said authentication data and perform all required further processing of it (including but not limited to passing identified authentication tokens to a known dedicated third party authentication/verification software authorities according to a configurable authentication sequence, processing the results of each token verification in real time and retrieval of the authenticated user's profile and associated permissions), thereby reducing or altogether eliminating any authentication operations performed by the device firmware and allowing for improved reliability, performance and efficiency of such authentication
4. Ability to maintain integrity of business data and transactions related to personal/group profiles, credentials, roles, permissions, authentication (included but not limited to passwords, biometric patterns, users' profiles and various related personalized content) in a secure and protected way, allowing for only authorized parties (whether automated third party software components or human beings) to retrieve this information
5. Ability to support enhanced security and access control based on the pre-defined limits of secure session duration, ensuring that any user would be automatically logged out after certain idle time
6. Ability to automatically enable a communication terminal associated with the authentication terminal with user's communication profile
7. Ability to support geographically distributed groups of users that can consist of "mix-and-match" of individual users, groups of users (communities) created according to some business rules, various locations (campuses, buildings, arbitrarily selected parts of buildings such as floors, wings, rooms, halls, common areas, etc.) and to dynamically resolve the user's credentials depending on their geographical locations or associations with the users or both (e.g. user A when in Location B has roles and permissions C, but when user A is in location D (s)he has roles and permissions E)
8. Ability to act as an industry-standard Presence Agent that is capable of aggregating information related to user presence and publish it to any industry-standard $3^{rd}$ party Presence Server based on the authenticated profile, business rules, policies and permissions, and location of the originating SSAP device
9. Ability to integrate and collaborate with various required third party enterprise business services using industry-standard protocols, either as an authorized software component or on behalf of the authenticated user (based on the user's credentials, profile and appropriate business rules, policies and permissions), including but no limited to publishing aggregated information related to the user's real-time presence status and location
10. Ability to act as a multi-modal interactive front-end view and controller to a third party Customer Relationship Management (CRM) system and/or Employee Relationship Management (ERM) system, including (but not limited to) ability to dynamically determine (based on the authenticated user's permissions and related business rules and policies) the type of requested CRM/ERM service, and ability to execute automated multi-modal interaction session with the user (according to the said CRM/ERM service scenario) using SSP as a communication terminal that according to its capabilities supports various modes of interactions with the user, including (but not limited to) reading of the aforementioned physical tokens, data input using IP telephone screen, speech input using third party Automated Speech Recognition (ASR) system, DTMF input, Text-To-Speech (TTS) conversions, etc.

Figure 2:
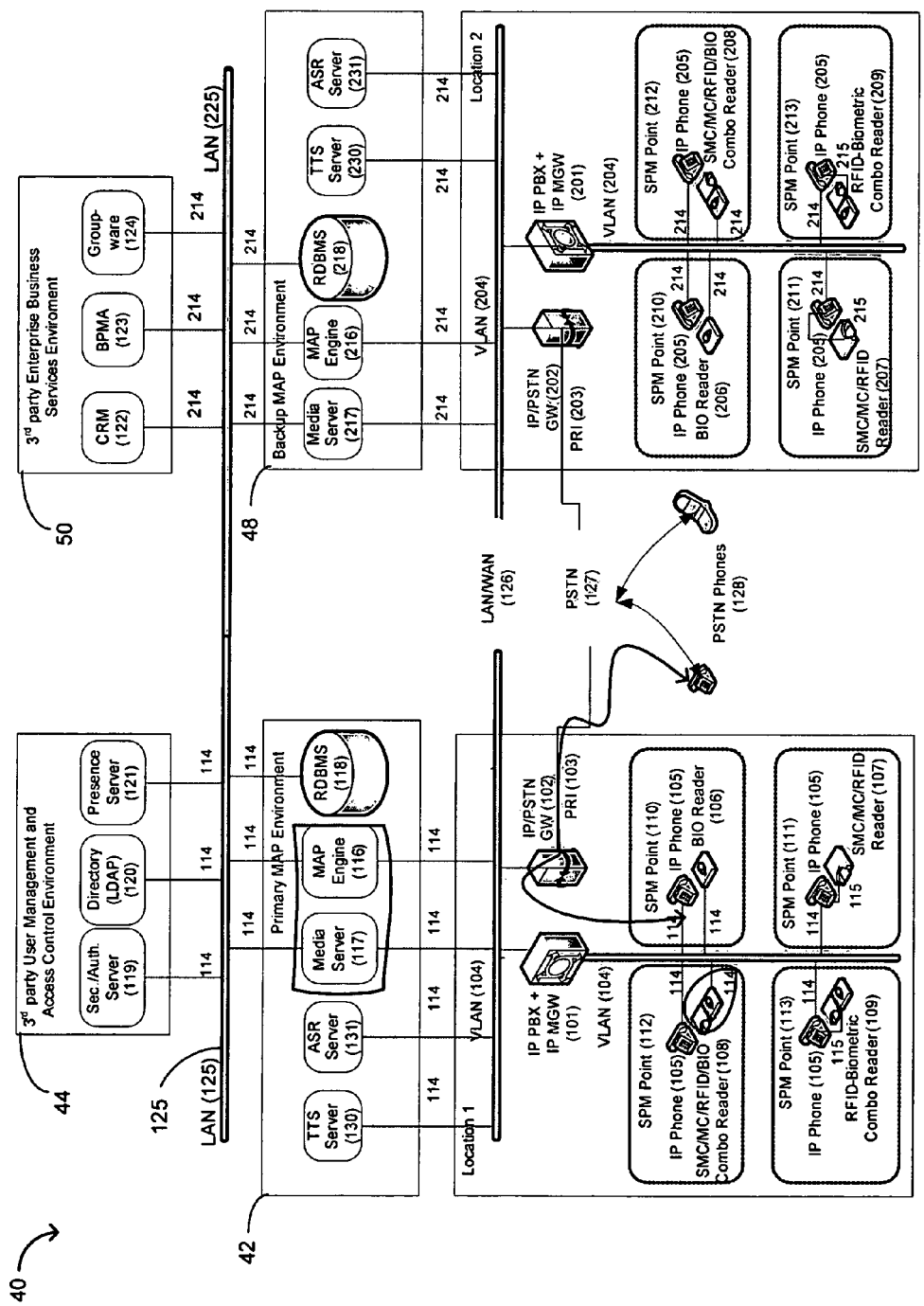
FIG. 2 shows a multi-modal service-point convergent communication system 40 in accordance with an application of the system 10 of FIGS. 1(a)-(d).

11. Ability (by use of industry-standard third party call control and media control functions supported by related IP Telephony equipment) either automatically or per user request to initiate a phone call to a designated $3^{rd}$ party (human being or automated system) at any moment during said automated multi-modal session; ability to associate all session-related data collected up to this moment with the said phone call and deliver it to the said third party; ability to transfer the said multi-modal session (including but not limited to call, audio stream, session state and associated data) from one party to another party; ability to conference any number of parties to the said multi-modal session with simultaneous and synchronized delivery of all session data components and streams 12. Ability to deliver all aforementioned functions in a distributed enterprise environment, in a hosted multi-tenant environment and in a service provider environment supporting the corresponding industry-standard requirements for high availability, fault tolerance, redundancy, scalability and load balancing FIG. 2 shows a multi-modal service-point convergent communication system 40 in accordance with an application of the system 10 of FIGS. 1(a)-(d). The system 40 is generally utilized for secure personal profile management and access control to the enterprise communication and business services over a convergent network, in accordance with an embodiment of the present invention.

The system 40 is shown to include a location 1 intended to refer to a location in which the structures (or similar structures) included therein are present, a primary MAP environment 42, a LAN 125 and a third party user management and access control environment 44 and counterparts thereto shown on the right side of the figure, as location 2, which is a counterpart to location 1, a backup MAP environment 48, which is a counterpart to the primary MAP environment 42 and a third party enterprise business services environment 50, in accordance with an embodiment of the present invention.

Location 1 is an exemplary embodiment, shown to include an IP PBX and IP media gateway 101 combined with IP/PSTN gateway 102 (at times referred to as a "softswitch") which provides the functionality of a traditional telephone PBX in a modular, open and distributed fashion, including comprehensive call control operations (call setup, teardown, transfer, conference, etc.) and voice traffic/media control and management (establishing audio streams between participating communication end points, mixing the said streams in case of call conference, redirecting the said streams in case of call transfer, etc.) and is coupled through a voice LAN (VLAN) 104 to four Secure Profile Management Point (SPM) points 112, 110, 113 and 111. While four SPM points are shown in FIG. 2, any number thereof may be employed without departing from the scope and spirit of the present invention.

In each SPM point, there is shown an IP telephone and a SPAR device. For example, the SPM point 112 includes an IP telephone 105 and a SPAR device 108 and the SPM point 110 includes an IP telephone 105 and a SPAR device 106 and the SPM point 113 includes an IP telephone 105 and a SPAR device 115 and the SPM point 111 includes an IP telephone 105 and a SPAR device 107. The IP telephones and SPAR devices of each of the SPM points 112, 110, 113 and 111 resemble that of the IP telephone 12 and the SPAR devices 14 of FIGS. 1(a)-(d) with the SPAR devices of each of the SPM points having a unique configuration among the various available configurations thereof, as discussed with reference to FIGS. 1(a)-(d). For example, in FIG. 2, the device 108 of the SPM point 112 includes a smart card reader, card reader, an RFID and a biometric reader whereas the device 106 only includes a biometric reader and so on.

An example of a component in the environments 44 and 50 is, for example Microsoft Office Active Directory by Microsoft, Inc. of Seattle, Wash. as the LDAP 120. Basically, they offer business functionality.

The VLAN 104 is shown further coupled to the SPM points 112, 110, 113 and 111 and couples these SPM points to the IP PBX and media gateway 101, which is, in turn, coupled, through the VLAN 104 to the IP/PSTN gateway 102. The gateway 102 is coupled, through a ISDN PRI trunk 103, to the PSTN cloud 127, thereby allowing the PSTN phones 128 to communicate with the IP telephone of any of the SPM points using VoIP, which is less costly and allows further flexibility and options, as will become evident shortly. The VLAN 104 is further employed to couple the gateways 101 and 102 to the LAN/Wide Area Network (WAN) 126.

Location 2 includes similar structures as that shown and discussed relative to Location 1, such as the IP/PSTN gateway 202, which is similar to the gateway 102 of Location 1, an IP PBX and media gateway 201, similar to the gateway 101 of Location 1, the combination of the gateway 201 and the gateway 202 functions substantially as a softswitch. The SPM points 210, 212, 211 and 213 are similar to that shown and discussed of the SPM points 112, 110, 113 and 111 of Location 1. VLAN 204 couples the gateway 201 and the SPM points 210, 212, 211 and 213 in the same manner as discussed relative to the Location 1 and the gateway 202 and the gateway 201 are coupled through the VLAN 204 to the PSTN cloud 127 and to the LAN/WAN cloud 126. The VLAN 204 is further employed to couple the gateways 201 and 202 to the LAN/WAN 126. The LAN 125 couples the environment 44 to the environment 42 and further couples the environment 50 to the environment 48.

The environment 42 is shown to include a Text-To-Speech (TTS) server 130, an Automatic Speech Recognition (ASR) server 131, a media server 117, a MAP engine 116 and a RDBMS 118. The servers 130 and 131 are shown to be coupled to the VLAN 104 through a local area network connection 114, as are the server 117, the engine 116 and the RDBMS 118, which are shown further coupled, through the connection 114, to the LAN 125.

The environment 48 is shown to include counterpart components to that of the components of the environment 42 because the environment 48 essentially serves as a backup environment to the environment 42 in the event a problem arises and any of the components of the environment 42 become inoperable. Accordingly, the coupling of the servers and/or engines of the environment 48 are the same as that of the environment. For example, the media server 217, the MAP engine 216, the TTS server 230 and the ASR server 231 are shown coupled through a local area network (LAN) connection 214 to the VLAN 204 of Location 2 and the server 217 and engine 216 are further shown coupled, through the connection 214, to the environment 50.

The environment 44 is shown to include a security/authentication server 119, a directory (LDAP) 120 and a presence server 121, which are each coupled, through the connection 114 and the LAN 125, to the environment 42. The environment 50 is shown to include a Customer Relationship Management (CRM) 122, a Business Process Management and Automation (BPMA) 123 and a groupware 124, which are each shown coupled through the connection 214 and the LAN 225, to the environment 48.

The structures or components with each of the Locations 1 and 2 are referred to as communication components and each communication component shown at the Location 1 has its matching counterpart at the Location 2 and some of the attributes are as follows:

- IP PBX combined with IP Media Gateway 101 (201) and connected to a dedicated Voice LAN 104 (204)
- Voice-over-IP telephones of various types 105 (205) connected to the corresponding Voice LAN 104 (204)
- IP/PSTN Gateway 102 (202) connected to the Public Switching Telephone Network (PSTN) 127 via ISDN PRI trunks 103 (203) to support connectivity between the IP PBX 101 (201) and various (wireless and wired) PSTN phones 128.
- Multi-modal VoIP phones (105, 205) that are capable of handling either combination of voice, data and video streams (the actual capabilities of these end points determine the multi-modal streams that would be delivered);
- Authentication devices (SPAR devices) that perform, among other procedures, the following authentication procedures: biometric authentication (fingerprint, palmprint or iris-reader), physical token authentication (magnetic card reader, smart card reader, RFID reader).

As earlier noted, the SPAR devices can be of different types, including but not limited to, biometric readers (106, 206), smart cards, magnetic cards or RFID readers (107, 207), or to compound devices that may include any combination of Smart Card, Magnetic Card, RFID and Biometric readers in a single unit (108, 208, 109, 209). Accordingly, the SPAR devices can support either separate types of authentication, or if combined in a unit, can perform several types of authentication separately or in combination (as an example of such combination, a biometric reader can be combined with a RFID and/or a smart card reader). The SPAR devices, such as the device 108, 106, 109 or 107 in FIG. 2, are coupled to the enterprise LAN 125 via standard network connection (or the connection 114, an example of which is the RJ-45) (either directly or through the network switch built into the IP phone).

Typically, each authentication device, such as each SPAR device, is associated with one or more IP telephones, and the logical associations between the SPAR device and the one or more IP telephones is generally stored in an appropriate software-based persistent storage repository (e.g., relational database, such as the RDBMS 118).

These SPAR devices may reside on the same physical chassis with IP phones or alternatively, they can be physically separated from their associated telephones; any such combination of a SPAR device and IP phone is referred to as "Secure Profile Management Point" (SPM Point) shown on the FIG. 2 as 110-113 and 210-213.

In operation, an authentication session begins when a user swipes (through the use of a magnetic card or RFID card) or enters authentication information (a password) using any of the SPAR devices of, for example, the SPM points 112, 110, 113 or 111. The authentication information is then captured and stored in the engine 116, through the VLAN 104 and the gateway 101 and is sent to the authentication server 119 for identification of the user. Once the user is identified, additional information regarding the user is provided by the Directory Server 120 to the MAP Engine 116. Additional information of the user includes but is not limited to personal and corporate profiles of the user, user permissions within the system. The server 121 provides the present status of the user, such as whether or not the user is available and/or active and the like.

The media server 117 is used to broadcast information, such as audio streams, to the user. The server 130 is used to convert text to audio file. The server 131 is used for speech recognition and the RDBMS 118 is a relational database system for storing of various types of information.

As previously alluded thereto, due to the mission-critical characteristic of the system 40, the environment 42 is essentially duplicated or its backup preserved by the environment 48. This redundancy is generally required for mission-critical applications.

Assuming a user profile has been created, upon an attempt by the user to access the IP phone, authentication of the user is performed and upon positive authentication of the user, the user profile is retrieved for storage and a telephony configuration of the communication terminal is built according to the stored user profile.

The Customer Relationship Management (CRM) 122, Business Process Management and Automation (BPMA) 123 and groupware 124 of the environment 50 each include various business applications. The PSTN phones 128 can be a landline or a mobile phone or any other conventional type of PSTN telephone. As an example of the processing of a phone call, assuming the call is originated from the IP phone 104, it is transmitted through the gateway 101 to the gateway 102 to the PSTN cloud 127 where the telephone company transfers it to the appropriate PSTN phone and vice versa if the call is originated from the PSTN phone 128.

It will be apparent as well, that the present invention is not limited to a multi-location architecture shown in FIG. 2, but may be applied as well to other arrangements of elements where VoIP-capable communication end points, or communication terminals, (whether in combination with SPAR devices or not) are used to handle multi-modal user interaction sessions including but not limited to internal, external incoming and external outgoing telephone calls, multi-modal broadcasts of data, voice and video streams, presence management and monitoring, etc.

Also connected to the VLAN 104 (204) and 125 (225) is a processor executing an instance of Multi-modal Application Platform application server 116 (or 216), generally referred to as a MAP Engine. The MAP Engine 116 (216) has several purposes associated with processing user authentication information that comes from any of the SPAR devices on the network. For example, the MAP Engine 116, by communicating with any registered SPAR device, has the capability of:

- Receive encrypted request from the SPAR device that includes authentication data
- Identify the type of authentication data
- Identify the SPAR device that is the source of the request
- Pass the encrypted authentication data to a $3^{rd}$ party authentication server
- Receive response from the authentication server that includes one or more attributes uniquely identifying the user
- Retrieve user's personal communication profile and configure the corresponding IP phone according to this profile Present the user with the list of available communication and business services according to the user's profile and permissions.

Based on the authenticated profile and location of the originating SPAR device and association of the SPAR device with IP phone, and using unified protocol for Presence Management (SIMPLE) the said MAP Engine can publish user-related presence information to any industry-standard 3$^{rd}$ party Presence Server Based on the authentication profile and type of preconfigured services can initiate an automated multi-modal session between the user and available/permitted enterprise communication or business services.

By additional communication with gateway 101 (201) the MAP Engine 116 has the capability of:

Configure one or more IP phones according to the user personal profile, taking into account geographical location of these phones and their association with IP PBX.

For each IP phone (105, 205) configured according to the user's personal profile exercise control over call functions, media functions and data functions so that the communication services available to the user would match the related personal profile and policy-based permissions. Such communication services include but are not limited to: accepting incoming calls, placing outbound calls, participating in teleconferences and multi-modal broadcasts, access to various corporate directories, etc.

Also in this embodiment MAP Engine 116 (216) maintains a peer-to-peer TCP/IP connection to an instance of application known by the inventor as Multi-Modal Media Server 117 (217) (hereafter termed "Media Server"). The said Media Server according to the control requests of the corresponding MAP Engine performs the actual delivery of combined voice, data and video streams to the VoIP phones of supported types and configurations according to the actual capabilities of the participating VoIP phones. The Media Server also performs a function of collecting users' input to the data forms supplied to the screen-enabled VoIP phones and passing this data to the MAP Engine, for the latter could process it and generate the subsequent control instructions based on the results of such processing and on relevant static and dynamic configuration data and business rules. There are a number of ways Media Server 118 may be implemented. For example, Media Server may be executed on the same hardware processor that executes the MAP Engine; alternatively it may run on a separate hardware processor independently or as an add-on component of a standard Web application server like Tomcat.

Also in FIG. 2, the MAP Engine 116 and the Media Server 117, via TCP/IP-based network connection 114, interact with an instance of an industry-standard relational database (RDBMS) 118 (218) that is used as storage for various data elements to which the MAP Engine 116 (216) and Media Server 117 (217) have read-write access; these data elements include (but are not limited to) system configuration information, real-time status, scheduling and historical data that is used to generate various business rules and interaction scenarios executed by the MAP Engine 116 (216) and the Media Server 117 (217), as well as for generation of various historical business reports related to the functions performed by the described system.

Also in FIG. 2, the same instances of MAP Engine and Media Server can simultaneously communicate with gateways of different vendors, seamlessly delivering the same functionality to IP phones and automatically adjusting presentation and flow logic to the vendor-specific capabilities of the corresponding IP phone.

Additionally, the MAP Engine 116 and the Media Server 117 use well-known industry-standard protocols and technologies for data encryption and secure communications when communicating between themselves, with SPAR devices and any other 3$^{rd}$ party components that require and support the data encryption and secure communications. These protocols and technologies include but are not limited to:

Transport Layer Security (TLS)

Internet Protocol Security (IP-Sec)

Secure Socket Layer (SSL) for both HTTP and TCP/IP traffic with up to 128 bit-based encryption The system 40 may include one or several hardware processors executing some or all of the following industry-standard 3$^{rd}$ party software components:

Security and Authentication Server (119) that is used to authenticate the user based on the authentication data collected and transmitted by a SPAR device and to provide MAP Engine with the data elements that would uniquely identify the user and would allow to retrieve the corresponding personal profiles and permissions LDAP-compliant Directory Server (120) that is used as an external persistent read-only storage of information related to users, departments, groups, and the corresponding permissions and policies SIMPLE-compliant Presence Server (121) is used to track real-time changes in the users' presence and availability statuses and to provide real-time notification about these changes to all system components (e.g., MAP Engine) that programmatically registered their interest in such status updates. The said MAP Engine (116, 216) can publish user-related real-time presence information to the Presence Server, and can subscribe to it for the purpose of receiving relevant presence information that may be published by other components.

Text-to-Speech Server 130 (230), that converts a typed text into a corresponding audio file in one of the supported formats (hereafter termed as TTS Server)

Automated Speech Recognition Server 131 (231) that in real time analyzes user's natural speech; and sends the recognized data elements to the MAP Engine (116, 216), thereby allowing for using natural speech as a mode of communication with the system. For example, the user may call into the system using PSTN phone 128 or one of the IP phones (105, 205), and after positive authentication can navigate through the available system's functions using natural speech.

Customer Relationship Management (CRM) software environment (122) that can be used by the MAP Engine (116, 216) to request and deliver relevant business services to an authenticated and authorized user by way of VoIP telephone (105, 205) as a multi-modal interaction terminal Business Process Management and Automation (BPMA) software environment (123) that can be used by the MAP Engine (116, 216) to request and deliver relevant business services to an authenticated and authorized user by way of VoIP phone (105, 205) as a multi-modal interaction terminal Various Groupware software (124) that can be used by the MAP Engine (116, 216) to retrieve relevant user, group and calendaring information, and that can serve as an authenticated client requesting authorized services provided by the said MAP Engine based on user's profile and related policy-based permissions.

In operation, the system 40 allows for a multi-level secure access of communication terminals, such as the IP telephone 12 of FIGS. 1(a)-(d). In one embodiment and method of the present invention, there are three levels of security, a physical authentication, a logical authentication and a biometric authentication. Both logical and physical authentications are performed by coordinated actions of MAP Engine (116) and Security and Authentication Server (119); no authentication is performed by the IP Phone; SPAR device associated with (attached to) the phone is used for capturing related authentication tokens and passing them securely to the MAP Engine (116), which in turn processed all captured authentication tokens and passes them to the Security and Authentication server (119).

Figure 3:
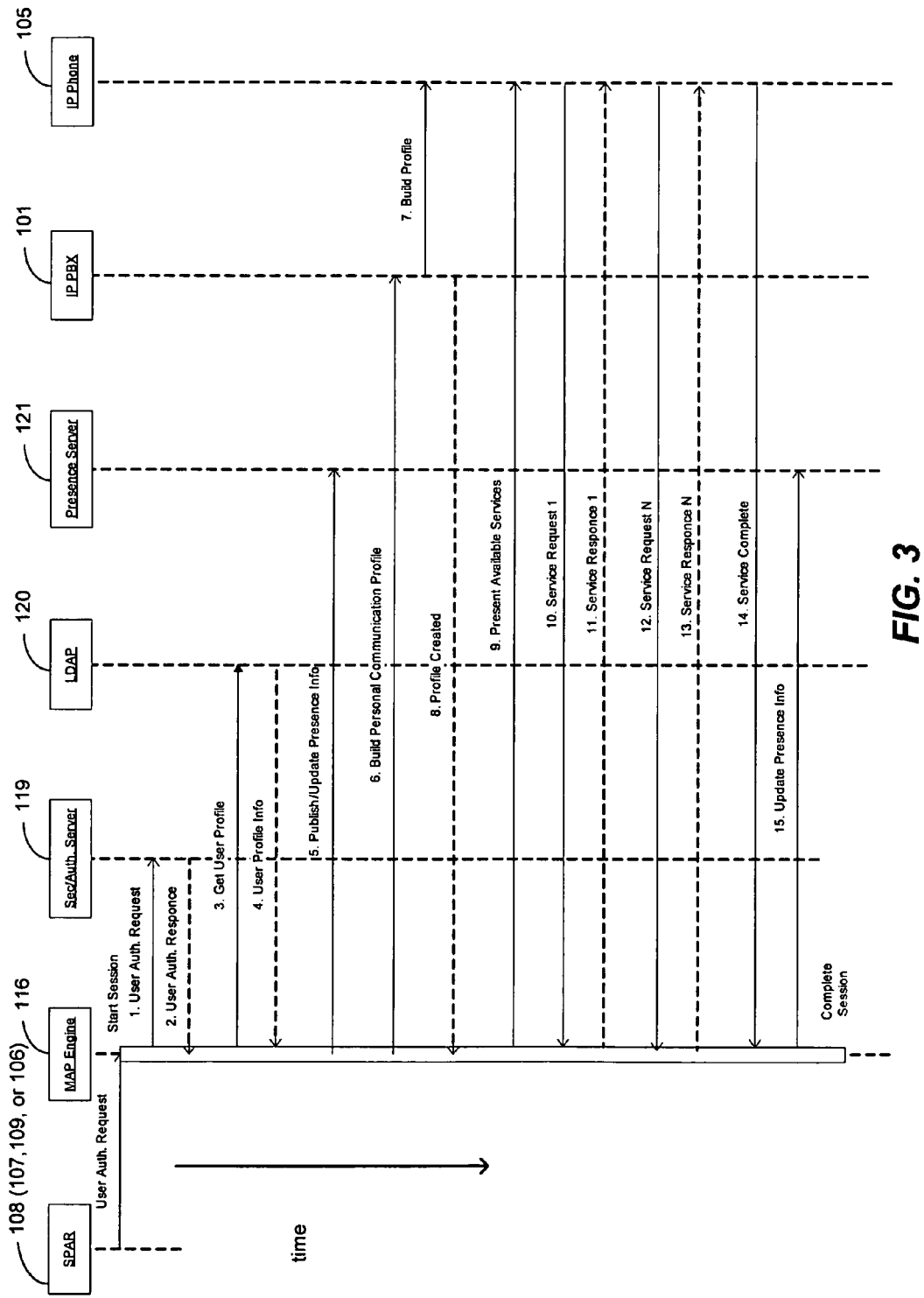
FIG. 3 depicts an example of a sample interaction flow chart of a session with a secure profile management.

FIG. 3 is a high-level sequence diagram depicting the flow of the session with secure profile management activity of FIG. 2. That is, vertically, time is represented going down the page and events and requests are represented horizontally on the page. The flow starts with User Authentication Request sent by a SPAR device, such as any of the SPAR devices of FIG. 2, to the MAP Engine 116 of FIG. 2. Having received such request, the MAP Engine, based on the information sent by the SPAR device and on other relevant configuration data, dynamically identifies the type of session and initiates it. A sample session flow may be as follows:

1. MAP Engine submits User Authentication Data received from the SPAR device to the Security and Authentication Server for authentication and authorization
2. Security and Authentication Server returns positive user authentication and user identification credentials
3. MAP Engine requests User Personal Profile and associated permissions from the LDAP Directory Server
4. LDAP Directory server sends requested data to the MAP Engine
5. MAP Engine publishes updated user-related presence information to the Presence Server
6. MAP Engine sends request to the IP PBX to build the user's personal communication profile on the VoIP Phone associated with the authenticating SPAR device
7. IP PBX builds the user's personal communication profile on the corresponding VoIP phone
8. IP PBX notifies MAP Engine about successful creation of the user's personal communication profile
9. MAP Engine presents list of available services to the user's VoIP phone
10. User selects a service and sends service request to the MAP Engine
11. MAP Engine performs requested actions and sends service response to the user's VoIP phone
12. User sends service requests to the MAP Engine
13. MAP Engine performs requested actions and sends service responses to the user's VoIP phone
14. User sends "Compete Service" request to the MAP Engine
15. MAP Engine publishes updated user-related presence information to the Presence Server and competes the session.

Figure 4:
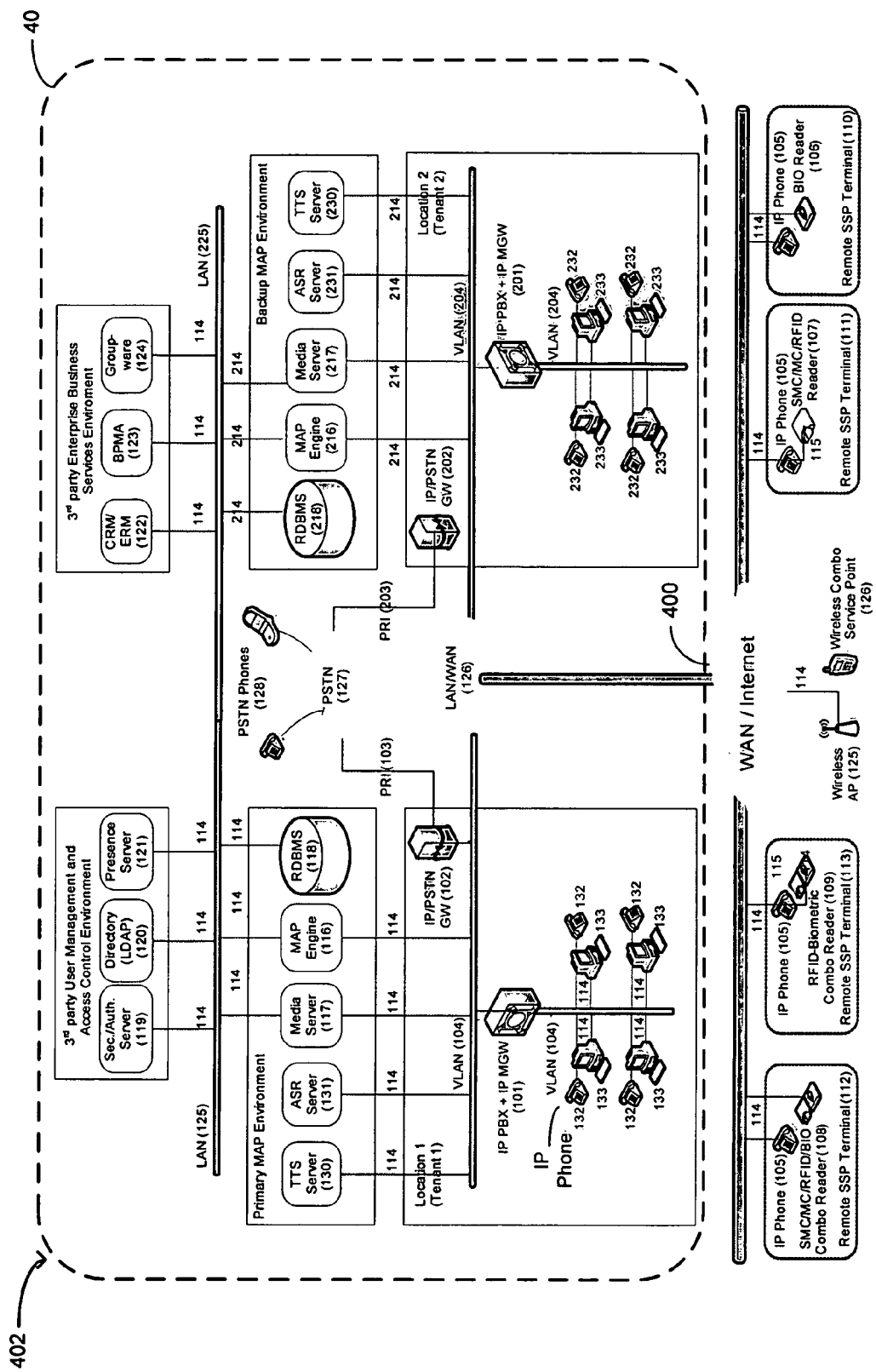
FIG. 4 shows a system 402 including the system 40 but with another configuration in accordance with an alternate embodiment of the present invention.

FIG. 4 shows a system 402 including the system 40 but with another configuration in accordance with an alternate embodiment of the present invention. In the system 402 of FIG. 4, the SPM points or SSP terminals, such as the combination of an IP phone 105 and a SPAR device 108, are shown located remotely and connected, through a Wide Area Network (WAN)/Internet cloud 400, to the system 40 or outside of the enterprise located, for example, in a store.

FIG. 4 is a high-level overview of distributed heterogeneous convergent communication infrastructure enhanced with the hardware and software that covers multi-location enterprise (which acts as a business service provider), and includes remote Secure Service Points that are installed outside of the enterprise boundaries in various publicly accessed locations (including but not limited to retail stores, bank branches, hotel lobbies and guest rooms, airport terminals and lounges, public phone booths, etc.) with the goal to deliver various business services to the users using multimodal interactive sessions according to the business logic controlled in real time from a secure centralized enterprise environment.

FIG. 4 and some of its structure will be explained in reference to FIG. 2, as many of the same structures or components are included in both figures. Each "business service provider" enterprise location includes the following key components of the enterprise convergent communication network (each communication component shown at the location 1 has its matching counterpart at the location 2; the numbering for the Location 1 component start with digit 1, the numbers of the corresponding components at Location 2 start with the digit 2):

- IP PBX combined with IP Media Gateway 101 (201) and connected to a dedicated Voice LAN 104 (204)
- Voice-over-IP Phones of various types 105 (205) connected to the corresponding Voice LAN 104 (204)
- Personal Computers of various types 133 (233) connected to the corresponding VLAN 104(204) or separate LAN 125 (225)
- IP/PSTN Gateway 102 (202) connected to the Public Service Telephone Network (PSTN) 127 via ISDN PRI trunks 103 (203) to support connectivity between the IP PBX 101 (201) and various (wireless and wired) PSTN phones 128.

The present invention assumes a heterogeneous distributed convergent network that contains both LAN/WAN segments (126) and WAN/Internet segments (129); it also contains multiple remote Secure Service Point terminals (110-113) connected to the WAN/Internet 129 via standard Ethernet connections 114.

Each remote SSP terminal (110-113) contains IP Phone 105 and associated SPAR apparatus (individual or combined, as shown on 106-109) described earlier in this embodiment.

Each remote SSP terminal (110-1113) can perform authentication procedure, the flow of which is controlled by customizable and configurable authentication sequence session that describes which authentication tokens and in which order the user should be challenged with. Depending on this authentication sequence session the involved SSP terminal can encrypt one or several captured authentication tokens at a time and send them securely to the controlling MAP Engine 116 (216), which based on the authentication sequence session would validate the captured authentication tokens perform one of the following three actions:

1) Confirm authentication, retrieve user profile and allow access to appropriate business services; or
2) Reject authentication and deny access to the system from the involved SSP terminal; or
3) Validate available authentication tokens and request more authentication steps until either action 1) or action 2) would be taken.

Once a positive user authentication is confirmed, the controlling MAP Engine 116 (216) retrieves the authenticated user's profile, determines the type of business service requested by the user (based on the user's permissions and associated business rules and policies), retrieves session scenario description from a permanent storage (RDBMS or file system) and starts multi-modal interactive session acting as an intermediary between the user and back-end enterprise CRM/ERM system that actually controls the requested business service and performs all related business transactions.

The said multi-modal session may consist of any combination of audio (in a form of prepared or TTS-generated audio files), video and data (in a form of text and/or images) streams generated according to the session scenario and sent upstream to the participating SSP Terminal (110-113); it would interact with the user by accepting input in multiple formats including (but not limited to) natural speech (processed by an ASR system), DTMF input, data input (using data forms pushed to the IP Phone 105 of the participating SSP Terminal) or token input (using the SPAR device 106-109 of the participating SSP Terminal 110-113).

At any moment during such multi-modal interactive session the controlling MAP Engine (either based on the user request or on the session scenario) can:

Initiate a phone call from the IP Phone 105 of the participating terminal to an IP Phone 132 (232) of an available Customer Service Representative (CSR)

Aggregate all business data collected up to this moment during the said multi-modal interactive session;

Associate this aggregated data with the call and pass it either to the CSR's IP Phone 132 (232) or to the associated computer 133 (233)

Should the said CSR decide to transfer the said multi-modal interactive session to another CSR, the controlling MAP Engine (per the former CSR's request) using $3^{rd}$ party call control and media control functions performs transfer of the session (call, associated data and video stream) to the IP Phone and computer of new designated CSR.

Should the said CSR decide to conference another CSR in the said multi-modal session, the controlling MAP Engine (per the former CSR's request) using $3^{rd}$ party call control and media control functions performs conference thereby adding IP Phone and computer of the latter CSR to the session so that all session streams (call, associated data and video stream) become available to this new CSR.

Figure 5:
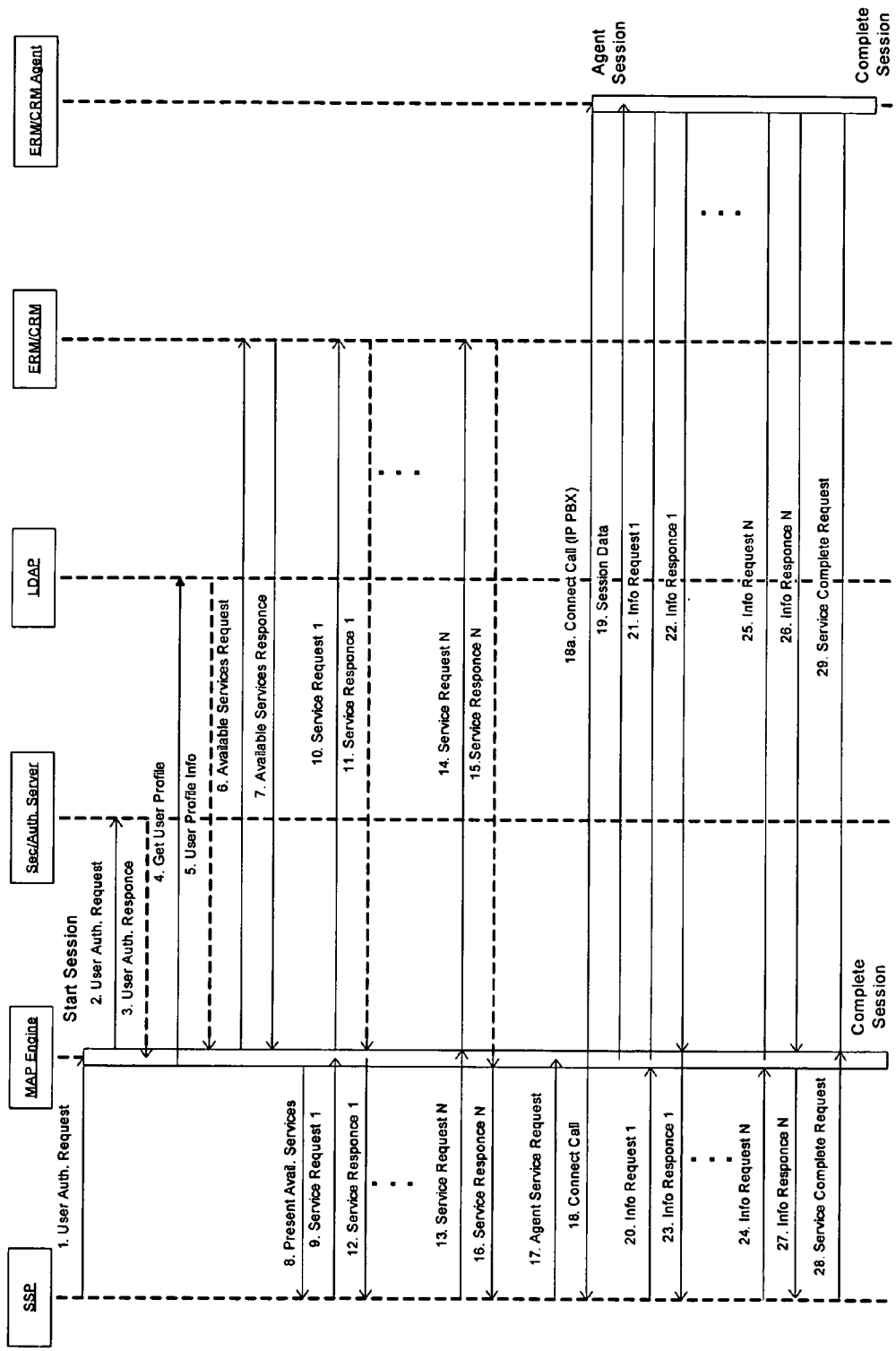
FIG. 5 is a high-level sequence diagram depicting the flow of the session using Secure Service Point and Multi-Modal Application Platform environment of FIG. 4.

FIG. 5 is a high-level sequence diagram depicting the flow of the session using Secure Service Point and Multi-Modal Application Platform environment of FIG. 4.

The flow starts with User Authentication Request sent by a SSP terminal to the MAP Engine. Having received such request MAP Engine, based on the information sent by the SSP terminal and on other relevant configuration data dynamically identifies correct type of session and initiates it. A sample session flow may look as follows:

1. SSP Terminal captures and securely submits encrypted User Authentication data
2. MAP Engine securely submits the said User Authentication Data received to the Security and Authentication Server for authentication and authorization
3. Security and Authentication Server returns positive user authentication and user identification credentials
4. MAP Engine requests User Personal Profile and associated permissions from the LDAP Directory Server
5. LDAP Directory server sends requested data to the MAP Engine
6. MAP Engine requests the list of available services from the CRM/ERM system based on the user's profile and associated permissions.
7. The CRM/ERM system returns the list of services available for the said user to the MAP Engine
8. MAP Engine presents the list of available services to the SSP terminal
9. The user selects a service and sends service request to the MAP Engine
10. MAP Engine performs actions related to this service request, including (but not limited to) reformatting it, and redirects properly formatted service request to the CRM/ERM system
11. The CRM/ERM system returns service response to the MAP Engine
12. MAP Engine performs actions related to this service response including (but not limited to) reformatting it according to the SSP terminal capabilities, and sends properly formatted service response to the SSP Terminal
13. The user continues interaction by sending more service requests
14. MAP Engine processes these requests as described earlier, and re-directs them to the CRM/ERM system
15. The CRM/ERM system returns the corresponding service responses to the MAP Engine
16. MAP Engine processes these responses as described earlier, and sends properly formatted service responses to the SSP Terminal
17. The user decides to talk to a CRM/ERM agent and sends "Agent Service Request" to the MAP Engine
18. MAP Engine via IP PBX initiates and connects call between the SSP Terminal's IP Phone and the selected Agent's IP Phone
19. Once the call is connected, MAP Engine presents all collected session information to the selected Agent's personal computer.
20. The user interacts with the CRM/ERM agent by talking and/or sending information request using SSP terminal if needed
21. MAP Engine performs actions related to this information request, including (but not limited to) reformatting it, and redirects properly formatted information request to the Agent's IP Phone and/or PC
22. The Agent responds to this request by talking and/or sending information response to the MAP Engine using PC and/or IP Phone
23. MAP Engine performs actions related to this information response including (but not limited to) reformatting it according to the SSP terminal capabilities, and sends properly formatted information response to the SSP Terminal
24. The user interacts with the CRM/ERM agent by talking and/or sending more information requests using SSP terminal if needed
25. MAP Engine processes these information requests as described earlier, and redirects properly formatted information requests to the Agent's IP Phone and/or PC
26. The Agent responds to this request as described earlier, by talking and/or sending information response to the MAP Engine using PC and/or IP Phone
27. MAP Engine processes these information responses as described earlier, and sends properly formatted information response to the SSP Terminal
28. The user indicates that the service is complete by sending "Service Complete" request to the MAP Engine.
29. MAP Engine notifies the CRM/ERM agent about service completion, completes the session, frees up all related resources and performs other related required actions.

Figure 6:
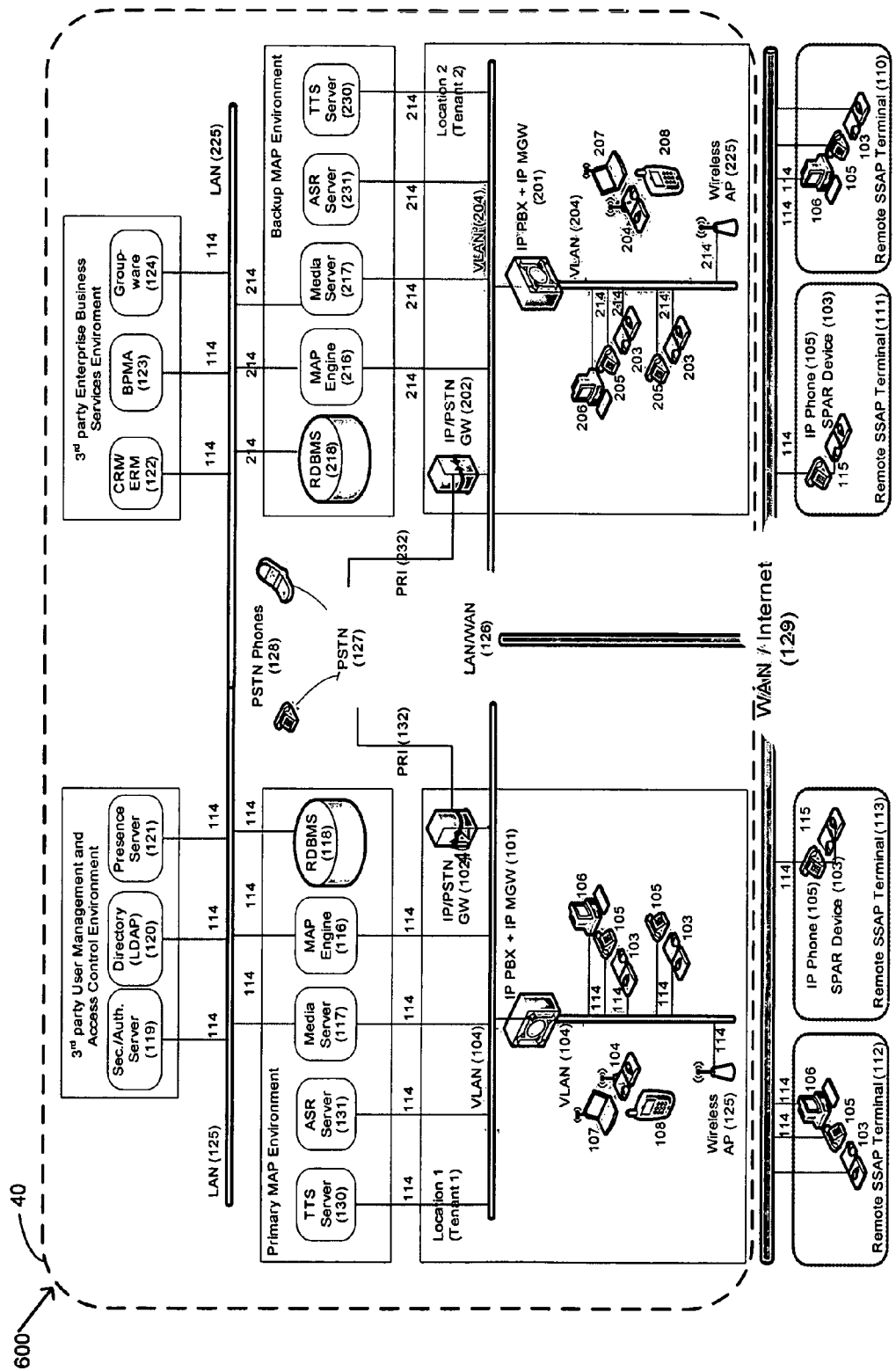
FIG. 6 is a simplified overview of distributed heterogeneous convergent communication infrastructure enhanced with the hardware and software for Secure Service Access Point operations, provisioning, management and controlled access to the enterprise communication and business services over convergent network according to the embodiment of the present invention.

FIG. 6 is a high-level overview of distributed heterogeneous convergent communication system 600 enhanced with the hardware and software for Secure Service Access Point operations, provisioning, management and controlled access to the enterprise communication and business services over convergent network according to another embodiment of the present invention. The system 600 includes the system 400 and covers multi-location enterprise (which can act as a business service provider), and includes remote Secure Service Access Points that are installed outside of the enterprise boundaries in various publicly accessed locations (including but not limited to retail stores, bank branches, hotel lobbies and guest rooms, airport terminals and lounges, public phone booths, etc.) with the goal to deliver various business services to the users using multi-modal interactive sessions according to the business logic controlled in real time from a secure centralized enterprise environment.

Figure 7:
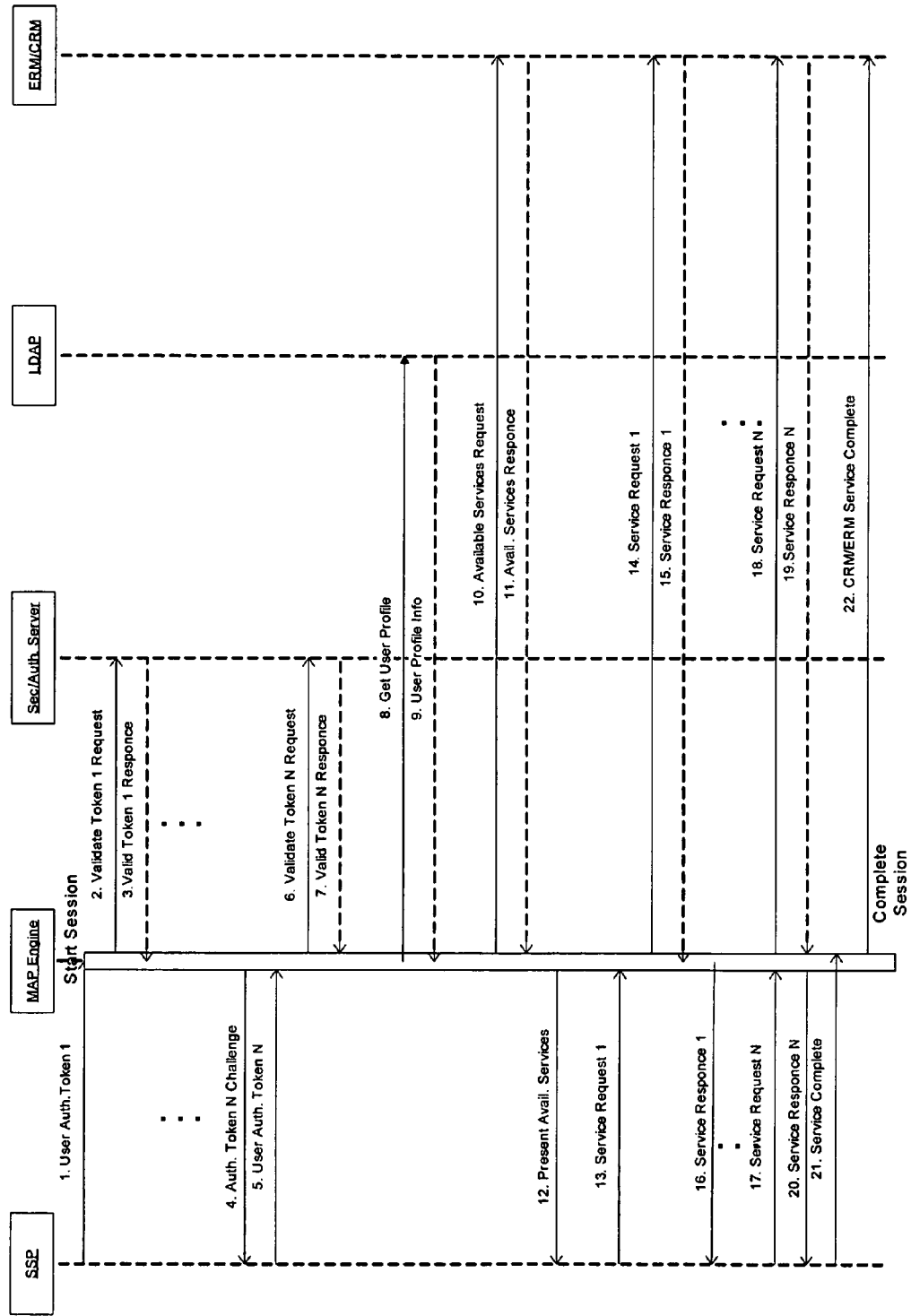
FIG. 7 is a high-level sequence diagram depicting the flow of the multi-level centralized authentication session using Secure Service Access Point and Multi-Modal Application Platform environment of the system 600.

FIG. 7 is a high-level sequence diagram depicting the flow of the multi-level centralized authentication session using Secure Service Access Point and Multi-Modal Application Platform environment of the system 600.

Each "business service provider" enterprise location is shown as a dashed rectangle and contains the following key components of the enterprise convergent communication network (each communication component shown at the location 1 has its matching counterpart at the location 2; the numbering for the Location 1 component start with digit 1, the numbers of the corresponding components at Location 2 start with the digit 2):

- IP PBX combined with IP Media Gateway 101 (201) and connected to a dedicated Voice LAN 104 (204)
- Voice-over-IP Phones of various types 105 (205) connected to the corresponding Voice LAN 104 (204)
- IP/PSTN Gateway 102 (202) connected to the Public Service Telephone Network (PSTN) 127 via ISDN PRI trunks 132 (232) to support connectivity between the IP PBX 101 (201) and various (wireless and wired) PSTN phones 128.

The present invention assumes a heterogeneous distributed convergent network that contains both LAN/WAN segments (126), wireless access points (125, 225) and WAN/Internet segments (129), and also includes:

- Multi-modal VoIP phones (105, 205) that are capable of handling any combination of voice, data and video streams (the actual capabilities of these end points determine the multi-modal streams that would be delivered);
- The said SPAR authentication devices, whether wired (103, 203) or wireless (104, 204) that are logically and physically associated with IP Phones in a "Secure Service Access Point" (SSAP) apparatus and can perform the following authentication procedures: biometric authentication (fingerprint, palm-print or iris-reader), physical token authentication (magnetic card reader, smart card reader, RFID reader)
- Multiple desktop (106, 206) and/or laptop computers (107, 207) connected to the network segments (104, 204, 126, 129) via wired (114, 214) connections or wireless access points (125, 225)
- Multiple remote SSAP terminals (110-113) connected to the WAN/Internet 129 via standard Ethernet connections 114.

An SSAP apparatus may contain one or more SPAR devices which can be of different types, including but not limited to biometric readers, smart card or magnetic card or RFID readers, or can be combined into compound devices that may include any combination of Smart Card, Magnetic Card, RFID and Biometric readers in a single unit (103). Accordingly an SSAP apparatus can support either separate types of authentication, or can perform several types of authentication alternatively or in combination. An SSAP apparatus is connected to the enterprise LAN either directly or through a standard dedicated Ethernet switch.

Normally each SPAR device would be associated with one or several IP phones and/or with one or several desktop or laptop computers; such logical associations would be stored in an appropriate software-based persistent storage repository (e.g., relational database), so that an SSAP apparatus can contain more than one associated SPAR device, more than one associated IP phones and can be associated with one or several desktop/laptop computers.

The SPAR devices associated with VoIP phones may reside on the same physical chassis with VoIP phones, or can be physically separated from their associated phones; any such logical combination of one or more SPAR devices with one or more IP phones is hereafter termed "Secure Service Access Point" (SSAP) shown on the FIG. 2 as 110-113 and 210-213.

It will be apparent as well, that the present invention is not limited to a multi-location architecture shown in FIG. 6, but may be applied as well to other arrangements of elements where VoIP-capable communication end points (whether included in SSAP apparatuses or not) are used to handle multi-modal user interaction sessions including but not limited to internal, external incoming and external outgoing telephone calls, multi-modal broadcasts of data, voice and video streams, presence management and monitoring, etc.

Also connected to the local area networks 104 (204) and 114 (214) is a processor executing an instance of Multi-modal Application Platform application server 116 (216), known by the inventors as MAP Engine. The MAP Engine 116 (216) has several purposes associated with processing user authentication information that comes from any SSAP apparatus on the network. For example, the said MAP Engine by communicating bi-directionally with any registered SSAP apparatus has the capability:

- Receive multiple encrypted requests with aggregated or separate authentication tokens from a registered SSAP apparatus
- Identify the SSAP apparatus that is a source of the request
- Parse and decrypt the said authentication tokens
- Accumulate and aggregate authentication tokens according to the "authentication scenario" and make positive or negative authentication decisions
- Pass the encrypted authentication tokens to a $3^{rd}$ party authentication server
- Receive and process according to the "authentication scenario" responses from the authentication server that contains one or several attributes that uniquely identify the user
- Retrieve user's personal communication profile and, by additional communication with IP PBX 101 (201) configure the VoIP phone in the corresponding SSAP apparatus according to this profile, taking into account geographical location of the SSAP apparatus and appropriate business rules and policies.
- Present the user with the list of available communication and business services according to the user's profile and permissions.
- Based on the authenticated profile and location of the originating SPAR device and association of the SPAR device with VoIP phone, and using unified protocol for Presence Management (SIMPLE) the said MAP Engine can publish user-related presence information to any industry-standard $3^{rd}$ party Presence Server
- Based on the authentication profile and type of preconfigured services can initiate an automated multi-modal session between the user and available/permitted enterprise communication or business services.
- Using additional communications with IP PBX 101 (201), for each VoIP phone (105, 205) configured according to the user's personal profile the said MAP Engine can exercise control over call functions, media functions and data functions, so that the communication services available to the user would match the related personal profile and policy-based permissions. Such communication services include but are not limited to: accepting incoming calls, placing outbound calls, participating in teleconferences and multi-modal broadcasts, access to various corporate directories, etc.

Also in this embodiment MAP Engine 116 (216) maintains a peer-to-peer TCP/IP connection to an instance of application known by the inventor as Multi-Modal Media Server 117 (217) (hereafter termed "Media Server"). The said Media Server according to the control requests of the corresponding MAP Engine performs the actual delivery of combined voice, data and video streams to the VoIP phones of supported types and configurations according to the actual capabilities of the participating VoIP phones. The Media Server also performs a function of collecting users' input to the data forms supplied to the screen-enabled VoIP phones and passing this data to the MAP Engine, for the latter could process it to generate the subsequent control instructions based on the results of such processing and on relevant static and dynamic configuration data and business rules. There are a number of ways Media Server 117 may be implemented. For example, Media Server may be executed on the same hardware processor that executes the MAP Engine; alternatively it may run on a separate hardware processor independently or as an add-on component of a standard Web application server like Tomcat.

Also in this embodiment MAP Engine and Media Server via TCP/IP-based network connection interact with an instance of an industry-standard relational database (RDBMS) 118 (218) that is used as a persistent storage for various data elements to which the MAP Engine 116 (216) and Media Server 117 (217) have read-write access; these data elements include (but are not limited to) system configuration information, real-time status, scheduling and historical data that is used to generate various business rules and interaction scenarios executed by the MAP Engine 116 (216) and the Media Server 117 (217), as well as for generation of various historical business reports related to the functions performed by the described system.

Also in this embodiment the same instances of MAP Engine and Media Server can simultaneously communicate with IP PBXs of different vendors, seamlessly delivering the same functionality to associated SSAP apparatuses and automatically adjusting presentation and flow logic to the vendor-specific capabilities of the corresponding SSAP apparatus.

Also in this embodiment MAP Engine and Media Server use well-known industry-standard protocols and technologies for data encryption and secure communications when communicating between themselves, with SPAR devices and any other 3$^{rd}$ party components that require and support the data encryption and secure communications. These protocols and technologies include but are not limited to:

Transport Layer Security (TLS)
Internet Protocol Security (IP-Sec)
Secure Socket Layer (SSL) for both HTTP and TCP/IP traffic with up to 128 bit-based encryption Also in this embodiment the system may contain one or several hardware processors running some or all of the following industry-standard 3$^{rd}$ party software components:

Security and Authentication Server (119) that is used to authenticate the user based on the authentication data collected and transmitted by a SSAP apparatus and to provide MAP Engine with the data elements that would uniquely identify the user and would allow to retrieve the corresponding personal profiles and permissions LDAP-compliant Directory Server (120) that is used as an external persistent read-only storage of information related to users, departments, groups, and the corresponding permissions and policies SIMPLE-compliant Presence Server (121) is used to track real-time changes in the users' presence and availability statuses and to provide real-time notification about these changes to all system components (e.g., MAP Engine) that programmatically registered their interest in such status updates. The said MAP Engine (116, 216) can publish user-related real-time presence information to the Presence Server, and can subscribe to it for the purpose of receiving relevant presence information that may be published by other components.

Text-to-Speech Server 130 (230), that converts a typed text into a corresponding audio file in one of the supported formats (hereafter termed as TTS Server)

Automated Speech Recognition Server 131 (231) that in real time analyzes user's natural speech captured as a digitized audio stream; and sends the recognized data elements to the MAP Engine (116, 216), thereby allowing for using natural speech as a mode of communication with the system. For example, the user may call into the system using PSTN phone 128 or one of the VoIP phones (105, 205), and after positive authentication can navigate through the available system's functions using natural speech.

Customer Relationship Management (CRM) and/or Employee Relationship Management (ERM) software system (122) that can be used by the MAP Engine (116, 216) to request and deliver relevant business services to an authenticated and authorized user by use of SSAP apparatus as a multi-modal interaction terminal, and to initiate and complete various transactions required by the corresponding business scenarios Business Process Management and Automation (BPMA) software system (123) that can be used by the MAP Engine (116, 216) to request and deliver relevant business services to an authenticated and authorized user by use of SSAP apparatus as a multi-modal interaction terminal, and to initiate and complete various transactions required by the corresponding business scenarios Various Groupware software (124) that can be used by the MAP Engine (116, 216) to retrieve relevant user, group and calendaring information, and that can serve as an authenticated client requesting authorized services provided by the said MAP Engine based on user's profile and related policy-based permissions.

Each remote SSAP terminal (110-113) can perform authentication procedure, the flow of which is controlled by customizable and configurable authentication sequence session that describes which authentication tokens and in which order the user should be challenged with. Depending on this authentication sequence session the involved SSAP terminal can encrypt one or several captured authentication tokens at a time and send them securely to the controlling MAP Engine 116 (216), which based on the authentication sequence session would validate the captured authentication tokens perform one of the following three actions:

1) Confirm authentication, retrieve user profile and allow access to appropriate business services; or
2) Reject authentication and deny access to the system from the involved SSAP terminal; or
3) Validate available authentication tokens and request more authentication steps until either action 1) or action 2) would be taken.

Once a positive user authentication is confirmed, the controlling MAP Engine 116 (216) retrieves the authenticated user's profile, determines the type of business service requested by the user (based on the user's permissions and associated business rules and policies), retrieves session scenario description from a permanent storage (RDBMS or file system) and starts multi-modal interactive session according to the said session scenario description.

FIG. 7 is a high-level sequence diagram depicting the flow of the multi-level centralized authentication session using Secure Service Access Point and Multi-Modal Application Platform environment of the system 600 of FIG. 6.

The flow starts with User Authentication Token 1 sent by a SSAP terminal to the MAP Engine. Having received such request MAP Engine, based on the information sent by the SSAP terminal and on other relevant configuration data dynamically identifies correct type of session and initiates it. A sample session flow may look as follows:

1. SSAP Terminal captures and securely submits encrypted User Authentication Token 1 (e.g., RFID tag)
2. MAP Engine securely submits the said User Authentication Token 1 received to the Security and Authentication Server for authentication and authorization
3. Security and Authentication Server returns positive authentication of the Token 1
4. According to the "authentication scenario" MAP Engine requests one or more additional User Authentication Tokens
5. SSAP Terminal captures, encrypts and securely submits additional authentication tokens to the MAP Engine
6. Once these additional encrypted tokens are received by the MAP Engine, it securely re-submits them to the Security and Authentication Server for authentication and authorization
7. Security and Authentication Server returns separate authentication results for each authentication token (the steps 4-7 are repeated until the user is either rejected or positively authenticated based on the "authentication scenario")
8. Once the user has been positively identified, MAP Engine requests the user's profile from a corresponding directory
9. LDAP Directory server sends requested data to the MAP Engine
10. MAP Engine requests the list of available services from the CRM/ERM system based on the user's profile and associated permissions.
11. The CRM/ERM system returns the list of services available for the said user to the MAP Engine
12. MAP Engine presents the list of available services to the SSAP terminal
13. The user selects a service and sends service request to the MAP Engine
14. MAP Engine performs actions related to this service request, including (but not limited to) reformatting it, and redirects properly formatted service request to the CRM/ERM system
15. The CRM/ERM system returns service response to the MAP Engine
16. MAP Engine performs actions related to this service response including (but not limited to) reformatting it according to the SSAP terminal capabilities, and sends properly formatted service response to the SSAP Terminal
17. The user continues interaction by sending more service requests
18. MAP Engine processes these requests as described earlier, and re-directs them to the CRM/ERM system
19. The CRM/ERM system returns the corresponding service responses to the MAP Engine
20. MAP Engine processes these responses as described earlier, and sends properly formatted service responses to the SSAP Terminal
21. The user indicates that the service is complete by sending "Service Complete" request to the MAP Engine.
22. MAP Engine notifies the CRM/ERM agent about service completion, completes the session, frees up all related resources and performs other related required actions.

Although the present invention has been described in terms of specific embodiment, it is anticipated that alterations and modifications thereof will no doubt become apparent to those more skilled in the art. It is therefore intended that the following claims be interpreted as covering all such alterations and modification as fall within the true spirit and scope of the invention.

What is claimed is:

1. A method of securely accessing a voice-enabled communication terminal, having certain functions associated therewith, using an Internet Protocol (IP) comprising:
   receiving user authentication data, from users using secure personal authentication reader (SPAR device), from a plurality of Secure Profile Management Point (SPM) points, each of the SPM points including an IP phone and a SPAR device, the IP phone and the SPAR device of each of the plurality of the SPM points being coupled, through a voice local area network (VLAN) and a gateway, to a plurality of servers and a Multi-modal Application Platform Application (MAP) engine;
   receiving a request from one of the SPAR devices;
   based on the received request, the MAP engine, identifying the source of the request among the SPAR devices;
   identifying the type of user authentication data received;
   using an authentication server, receiving a response from the authentication server that includes one or more attributes uniquely identifying the user;
   performing authentication of a user;
   upon positive authentication of the user, retrieving the user profile for storage and building a telephony configuration according to the stored user profile;
   transmitting to the user a list of available communication and business services according to a user's profile and permission;
   based on the authenticated user's profile and location of the originating SPAR device and association of the SPAR device with an IP phone, publishing user-related presence information to a presence server; and
   based on the authenticated user profile and user-related presence information, initiating an automated multi-modal session between the user and available and permissible business services.

2. A method of securely accessing a voice-enabled communication terminal, as recited in claim 1, wherein the authentication step includes performing biometric verification of the user.

3. A method of securely accessing a voice-enabled communication terminal, as recited in claim 1, further including the step of—using the user profile to build functions for the IP telephone.

4. A method of securely accessing a voice-enabled communication terminal, as recited in claim 1 further including encrypting authentication data for authentication of the user.

5. A secure service point (SSP) system comprising: a plurality of secure personal authentication reader (SPAR) devices, each coupled to a corresponding communication terminal, which is in communication with a network switch for performing physical authentication of a user, for performing logical authentication of the user, for performing verification of the user and upon successful confirmation of the user, allowing access to the functions of the communication terminal, using a Multi-modal Application Platform Application (MAP) engine, the MAP engine being coupled, through a voice local area network (VLAN) to a plurality of Secure Profile Management Point (SPM) points included in the SSP system, each of the SPM points including an IP phone and a SPAR device, prior to authentication of the user, receiving user authentication data, from users of the SPAR devices, the MAP engine operative to identify the source of the request among the SPAR devices and identify the type of user authentication data received, using an authentication server, a response is received that includes one or more attributes uniquely identifying the user and the user is presented with a list of available communication and business services according to a user's profile and permission, and based on the authenticated user's profile and location of the originating SPAR device and association of the SPAR device with an IP phone, a user-related presence information is published to a presence server, and based on the authenticated user profile and user-related presence information, an automated multimodal session is initiated between the user and available and permissible business services.

6. A SSP system, as recited in claim 5, wherein the communication terminal is an Internet Protocol (IP) telephone.

7. A SSP system, as recited in claim 6, wherein the user profile includes functions for the IP telephone.

8. A SSP system, as recited in claim 6, wherein the SPAR device includes any combination of a smart card reader, a biometric reader, a magnetic card or RFID.

9. A SSP system, as recited in claim 6, wherein at least one IP telephone and an associated SPAR device are employed in a multi-modal service-point convergent communication system.

10. A SSP system, as recited in claim 9, wherein said at least one IP telephone and an associated SPAR device are configured to dynamically determine the type of requested service from the user, and ability to execute automated multi-modal interaction session with the user.

11. A SSP system, as recited in claim 9, wherein said multi-modal service-point convergent communication system includes a Customer Relationship Management (CRM) software environment for requesting and delivering relevant business services to an authenticated user through the IP telephone.

12. A SSP system, as recited in claim 6, wherein at least one of the IP phones is configured according to the user profile taking into account the geographical location of the IP phone.

13. A SSP system, as recited in claim 12, wherein control is exercised over call functions, media functions and data functions of those IP phones that are configured according to the user profile wherein a match of the IP phone and the user profile is made such that certain communication services are made available to the user and certain policy-based permissions are made based on the match.

14. A SSP system, as recited in claim 6, wherein at least one of the IP phones is configured receive a combination of voice, data and video streams.

15. A method of securely accessing a voice-enabled communication terminal, as recited in claim 1, wherein each user is distinctly authenticated and the MAP engine determining the authentication of an IP phone and transmitting information to the IP phone accordingly.

16. A SSP system, as recited in claim 5, wherein each user is distinctly authenticated and the MAP engine determines the authentication of an IP phone and transmitting information to the IP phone accordingly.

* * * * *